(12) United States Patent
Totsu

(10) Patent No.: US 6,378,406 B1
(45) Date of Patent: Apr. 30, 2002

(54) COMBINATION OF DRIVER BIT AND SCREW

(76) Inventor: Katsuyuki Totsu, 32-13, Oshiage 1-chome, Sumida-ku, Tokyo (JP)

(*) Notice: Subject to any disclaimer, the term of this patent is extended or adjusted under 35 U.S.C. 154(b) by 0 days.

(21) Appl. No.: 09/622,865

(22) PCT Filed: Feb. 23, 1999

(86) PCT No.: PCT/JP99/00817

§ 371 Date: Aug. 23, 2000

§ 102(e) Date: Aug. 23, 2000

(87) PCT Pub. No.: WO99/43472

PCT Pub. Date: Sep. 2, 1999

(30) Foreign Application Priority Data

| Feb. 24, 1998 | (JP) | 10-042250 |
| Apr. 24, 1998 | (JP) | 10-115739 |
| Sep. 29, 1998 | (JP) | 10-276248 |

(51) Int. Cl.[7] .............................. B25B 23/00
(52) U.S. Cl. ........................... 81/460; 411/404
(58) Field of Search .................... 81/125, 436, 460; 411/404

(56) References Cited

U.S. PATENT DOCUMENTS 3,234,982 A * 2/1966 Stillwagon ................ 81/460
3,894,450 A * 7/1975 Hill et al. ................. 81/125 X
5,370,021 A * 12/1994 Shigematsu .............. 81/460 X

FOREIGN PATENT DOCUMENTS

| JP | 49-58955 | 5/1974 |
| JP | 49-150998 | 12/1974 |
| JP | 63-116272 | 7/1988 |
| JP | 1-141914 | 9/1989 |
| JP | 3-53611 | 5/1991 |
| JP | 8-145024 | 6/1996 |
| JP | 09-177743 | 7/1997 |

* cited by examiner

Primary Examiner—James G. Smith
(74) Attorney, Agent, or Firm—Finnegan, Henderson, Farabow, Garrett & Dunner, L.L.P.

(57) ABSTRACT

A screwdriver bit (50) fitted to a screw wherein generally vertical end wall parts of a specified depth are formed in the bit fitting grooves of a screw head part at the end edge parts, a generally flat bottom part is formed directing from the lower edge part of the vertical end wall parts to the center part of a screw neck part, and a conical bottom surface is so formed at its center part, comprising flat blade parts (52) forming, at the top end parts, generally vertical end edge parts fitted into the bit fitting grooves of the screw head part along the vertical end wall parts, the top end surfaces of the flat blade parts being formed in a conical protruded part (54) having an inclination angle θ of approx. 1 to 45° relative to the horizontal plane, whereas the screw having stage parts at the end edge parts of the bit fitting grooves of the screw head part, forming inclined groove parts extendedly directing from these stage parts to the center part 12 of the screw neck part, forming a generally conical bottom surface at its bottom part, and forming wall parts recessed inward from a vertical plane at the end edge parts of the bit fitting grooves through a specified depth.

11 Claims, 13 Drawing Sheets

COMBINATION OF DRIVER BIT AND SCREW

TECHNICAL FIELD

The present invention relates to a driver bit and a screw for use therewith. More particularly, it relates to a combination of a driver bit and a screw fitting the driver bit which combination effects tight mating of crossed flutes or bit mate flutes formed on the screw head portion and the driver bit fitting the flutes and always enables quick positive screwing and unscrewing by transmission of appropriate torque.

BACKGROUND ART

Conventionally known are the combinations of typical screws and driver bits as shown in FIGS. 13 to 16. That is, FIGS. 13 and 14 show a conventional screw with crossed flutes; FIG. 15 shows a driver bit for use with the screw with crossed flutes; and FIG. 16 shows the aforementioned screw and driver bit, mated with each other.

A prior art screw 10 shown in FIG. 13 is provided, on a screw head portion 10a thereof, with crossed flutes 12. The crossed flutes 12 are provided with constantly inclined flute portions 12a, each extending from the end portion towards the central portion of a screw neck portion 10b. The crossed flutes 12 are also provided, on a bottom portion thereof, with a substantially conical bottom surface 14 inclined gradually. Incidentally, reference numeral 13 designates tapered sidewall portions formed between adjacent crossed flutes 12. That is, the tapered sidewall portions 13 engageably contact with the blade portions of a driver bit, which is described later. In addition, at the corners adjoining the respective inclined flute portions 12a, tapered coupling surfaces 17a, 17b are formed which extend from the position of the conical bottom surface 14 to the opening rim portions of the crossed flutes 12 on the screw head portion 10a. These tapered coupling surfaces 17a, 17b are also adapted to engageably contact part of the blade portions of the driver bit, which is described later.

On the other hand, a prior art driver bit 20 shown in FIG. 15 is provided with blade portions 22 to fit the crossed flutes 12 of the aforementioned screw 10. The driver bit 20 is also provided with extended blade portions 22a each extended so as to fit the shape of the inclined flute portions 12a that are formed to orient towards the central portion of the screw neck portion 10b from the end portions of the aforementioned crossed flutes 12. Incidentally, reference numeral 23 designates tapered sidewall portions that are formed on the both sides of the aforementioned respective blade portions 22 or extended blade portions 22a. That is, the tapered sidewall portions 23 engageably contact with the tapered sidewall portions 13 formed in the crossed flutes 12 of the aforementioned screw 10.

According to the combination of the prior art screw and driver bit formed as such, when the screw 10 and the driver bit 20 are fit to each other as shown in FIG. 16, the blade portions 22 of the driver bit 20 and extended blade portions 22a fit into the inclined flute portions 12a of the crossed flutes 12, respectively, as described above. The sidewall portions 23 of the aforementioned blade portions 22 and extended blade portions 22a are brought into contact with the tapered sidewall portions 13 of the crossed flutes 12 of the screw 10. Thus, rotating the driver bit 20 allows a predetermined torque to be transmitted to the screw 10. That is, screwing and unscrewing can be achieved on a desired target object to be screwed.

However, according to the combination of the prior art screw 10 and the driver bit 20 formed as described above, the crossed flutes 12 of the screw head portion 10a form constantly inclined flute portions 12a orienting towards the central portion of the screw neck portion 10b from the end portions thereof. On the other hand, for the driver bit 20 corresponding thereto, the ridge portions of the extended blade portions 22a fit the shape of the aforementioned inclined flute portions 12a to fit into the aforementioned crossed flutes 12. Moreover, the ridge portions of the extended blade portions 22a are made wider gradually backwards from the distal end portion thereof. Furthermore, the tapered sidewall portions 23 formed on the respective blade portions 22 of the driver bit 20 are also engageably brought into contact with the tapered sidewall portions 13 formed in the crossed flutes 12 of the screw 10. Accordingly, since the aforementioned driver bit 20 and the crossed flutes 12 can be said to be totally in taper contact with one another, rotating the aforementioned driver bit 20 in a predetermined direction causes the distal end of the driver bit 20 to fly outwardly along the inclined surface of the inclined flute portions 12a of the aforementioned crossed flutes 12 (shown by an arrow in FIG. 16), resulting in the so-called "come-out phenomenon".

In particular, as shown in FIG. 14, the shape of the crossed flutes of a prior art screw is formed in such a manner that the respective crossed flutes 12 are made relatively larger in width than the ridge portions of the extended blade portions 22a of the driver bit 20 in order to facilitate mating the distal end of the driver bit 20 with the crossed flutes. On the other hand, the area of the tapered sidewall portions 13 and the tapered coupling surfaces 17a, 17b, formed at a boundary portion or corner portions between adjacent crossed flutes 12, 12, is relatively small. Accordingly, rotating the aforementioned driver bit 20 causes a great amount of stress to be loaded on the aforementioned tapered sidewall portions 13 and the tapered coupling surfaces 17a, 17b. Thus, as shown in FIG. 14 with shaded portions 15, great fastening resistance would cause the aforementioned tapered sidewall portions 13 and the tapered coupling surfaces 17a, 17b to be gradually damaged. Therefore, an increase in the damaged portions (the shaded portions 15) would make the come-out phenomenon to occur frequently in the aforementioned driver bit 20, making it impossible to effect screwing.

From these points of view, it is necessary to apply thrust to the driver bit 20 to strongly press the bit against the flute portions 12a at the time of rotating the driver bit 20 in order to prevent the come-out phenomenon in the aforementioned driver bit 20. However, pressing the bit as such would cause screwed target objects, particularly such as precision parts, to be broken or damaged although no problem will occur if the target objects are rigid bodies such as meal.

In addition, the occurrence of the aforementioned come-out phenomenon would cause the distal end portion of the bit or the blade portions 22 and extended blade portions 22a to be worn quickly. The wear would cause the aforementioned come-out phenomenon to occur more frequently, resulting in an increase of the damage of the screw flutes.

Furthermore, applying an excessive thrust to the aforementioned driver bit 20 could be useful to prevent the aforementioned come-out phenomenon. However, this would make it impossible to transmit precise torque to the screw, and thus operators would apply different amount of thrust to the driver bit 20. Consequently, torque for fastening screws would become greatly different from operator to operator.

Still furthermore, when tapping screws are screwed into a target object made of synthetic resin or the like, friction caused by the thrust would be added to that by the rotation of the screw. This would cause a great amount of heat to be produced to such an extent as to reduce the hardness of the screwed portion of the target object, thereby causing the screw to become loose or the target object to be damaged.

On the other hand, when screwing is carried out manually, rotating the driver bit 20 while sufficiently pressing the driver bit 20 against the screw would require a great amount of effort of the operator and make the operator exhausted.

In addition, according to the combination of the aforementioned prior-art screw 10 and the driver bit 20, when screwing is carried out with a manual tool or an electric tool, it is difficult to rotate the screw while maintaining the screw axis and the driver bit axis in proper alignment with each other at the time of fitting the distal end potion of the bit to the screw flutes. Therefore, when the screw axis is inclined relative to the driver bit axis, not only the aforementioned come-out phenomenon but also damage to the screw flutes will occur frequently.

Furthermore, at the time of unscrewing, like in the foregoing, the come-out phenomenon and damage to the screw flutes will be likely to occur. However, in this case, it will become impossible to remove the screws, thus resulting in such a situation as to break part of the target object to be unscrewed. In particular, when dust particles clog the screw flutes, the aforementioned situation occurs more frequently.

From these points of view, the present applicant previously suggested the combination of screws and driver bits which can effectively prevent the come-out phenomenon of the driver bit and damage to screws as occurred conventionally (Japanese Patent Laid-Open Publication No.Hei 8-145024 and No.Hei 9-177743). In addition, the combination can always provide appropriate and quick screwing and thus make it possible to significantly improve the efficiency of screwing even when damage has occurred to the bit mate flutes of the screw. This is achieved by improving the structure of the flute portions of the bit mate flutes of the screw in the combination of the screw and the driver bit.

The combination of a screw and a driver bit according to Japanese Patent Laid-Open Publication No.Hei 8-145024 is formed as shown in FIG. 12(b). That is, vertical end wall portions 32a of a predetermined depth are formed at the end portions of the bit mate flutes 32 of the screw head portion 30a. Horizontal stepped portions 32b are provided from the vertical end wall portions. Inclined flute portions 32c are provided to orient towards the central portion of the screw neck portion 30b from these horizontal stepped portions 32b. Alternatively, tapered or curved flute portions are extendedly formed to orient towards the central portion of the screw neck portion 30b from the aforementioned vertical end wall portions. In addition, a substantially conical bottom surface 34 is formed at the bottom portion thereof. The screw is thus formed to fit the driver bit comprising wing portions for engaging the vicinity of the aforementioned stepped portions or the curved flute portions (refer to FIG. 12(a)).

That is, referring to FIG. 12(b), right-angle rim portions 42a and extended wing portions 42b formed at wing portions 42 of a driver bit 40 fit into the horizontal stepped portions 32b and the inclined flute portions 32c of the bit mate flutes 32 of the screw 30, respectively. Then, sidewall portions 43 of the aforementioned wing portions 42 and extended wing portions 42b are brought into contact with the sidewall portions 33 of the bit mate flutes 32 of the screw 30. Thus, rotating the driver bit 40 allows a predetermined torque to be transmitted to the screw 30.

The combination of a screw and a driver bit according to Japanese Patent Laid-Open Publication No.Hei 9-177743 is formed as shown in FIG. 12(c). That is, vertical end wall portions 32a of a predetermined depth are formed at the end portions of the bit mate flutes 32 of the screw head portion 30a. Non-planar bottom portions are formed which are raised towards the central portion of the screw head portion from the lower rim portions of these vertical end wall portions. Inclined flute portions 32c are formed towards the central portion of the screw neck portion from these raised portions of the non-planar bottom portions. In addition, a substantially conical bottom surface is formed at the bottom portion thereof. The screw is thus formed to fit the driver bit comprising blade portions formed like in the foregoing (refer to FIG. 12(a)).

That is, referring to FIG. 12(c), horizontal surface portions 42a and projections 42b formed at flat blade portions 42 of a driver bit 40 fit into the non-planar bottom portions 32b and the inclined flute portions 32c of the bit mate flutes 32 of the screw 30, respectively. Then, sidewall portions 43 of the aforementioned blade portions 42 and projections 42b are brought into contact with the sidewall portions 33 of the bit mate flutes 32 of the screw 30. Thus, rotating the driver bit 40 allows a predetermined torque to be transmitted to the screw 30.

For the driver bit 40 according to the aforementioned respective suggestions, the horizontal stepped portions 32b or non-planar bottom portions 32b are formed at the bit mate flutes 32 of the screw 30. Thereby the contact area of the sidewall portions 33 of the bit mate flutes 32 which is brought into contact with the wing portions 42 of the driver bit 40 or the sidewall portions 43 of the flat blade portions 42 can thereby be increased. On the other hand, the tapered contact area in which the inclined flute portions 32c of the bit mate flutes 32 of the screw 30 are brought into contact with the extended wing portions 42b or the projections 42b of the driver bit 40 is only partial and small. Accordingly, the come-out phenomenon that occurs in the combination of a prior art screw and a driver bit can be positively prevented.

However, even the combinations of the screws and the driver bits according to the aforementioned suggestions are not still satisfactorily sufficient to effect more smoothly and quickly the mating of the distal end portion of the driver bit with the bit mate flutes formed on the screw head portion.

That is, in the structure of the driver bit 40 previously suggested, it was found that the distal end portion of the aforementioned flat blade portions 42 slidingly chafes against the surface of the screw head portion to damage the surface when the flat blade portions 42 comprising the horizontal surface portions 42a, extending substantially at a right angle, engaged with the vertical end wall portions 32a formed at the end portions of the aforementioned bit mate flutes 32 fit into the bit mate flutes 32 formed on the head portion of the screw 30 while rotating the aforementioned driver bit.

Furthermore, even when the distal end of the aforementioned driver bit 40 fits into the bit mate flutes 32 of the screw head portion 30a, the come-out phenomenon is sometimes caused to occur. That is, in the combination of the driver bit shown in FIG. 12(a) and the screw shown in FIG. 12(b), for example, right-angle crossovers between the aforementioned vertical end wall portions 32a and the horizontal stepped portions 32b are sometimes raised due to the wear produced by a header punch for punching the bit mate flutes 32 when the horizontal stepped portions 32b extending at a right angle from the vertical end wall portions 32a of a predetermined depth formed at the end portions of the bit mate flutes 32 of the screw head portion 30a are not properly formed in mass production of the screw. In the case like this, it was found that the distal end of the aforementioned driver bit 40 could not sufficiently fit into the bit mate flutes 32 of the screw head portion 30a, resulting in an unstable fitting and potentially causing the come-out phenomenon to occur while rotating the driver bit 40.

On the other hand, in the combination of the driver bit shown in FIG. 12(a) and the screw shown in FIG. 12(c), the bit mate flutes 32 includes non-planar bottom portions 32b in place of the aforementioned horizontal stepped portions 32b to set to a deeper dimension. This makes it possible to avoid the aforementioned come-out phenomenon. However, since the strength of the screw neck portion 30b was reduced, it was found that the screw head portion 30a could be cut off at the time of fastening operation with driver bit 40.

Accordingly, the present inventor has made intensive studies and pilot productions. Consequently, in a driver bit fit for a screw with substantially vertical end wall portions of a predetermined depth, the wall portions being formed at end portions of bit mate flutes of a screw head portion, with substantially planar bottom portions formed to orient towards a central portion of a screw neck portion from lower rim portions of the vertical end wall portions, and with a conical bottom surface formed at the central portion, the present inventor formed the driver bit in such a manner that the aforementioned driver bit comprises flat blade portions having substantially vertical end portions for fitting a distal end portion thereof into the bit mate flutes of the screw head portion along the vertical end wall portions, and a distal end face of the flat blade portions is formed as a conical projected portion inclined at an angle of from 1 to 45° relative to the horizontal or preferably at an angle of from 25 to 35°. By forming the driver bit as such, when the distal end of the aforementioned flat blade portions slidingly chafes against the surface of the screw head portion at the time of mating the driver bit with the bit mate flutes formed on the screw head portion while rotating the driver bit, it was found that the surface would not be damaged at all and the distal end of the flat blade portions fits into the screw, thereby preventing positively the come-out phenomenon even while the driver bit was being rotated.

On the other hand, as a screw that fits the aforementioned driver bit, used is a screw comprising end portions of bit mate flutes of a screw head portion, formed as vertical end wall portions with a predetermined depth; stepped portions formed at lower rim portions of the vertical end wall portions; inclined flute portions formed to incline towards a central portion of a screw neck portion; a conical bottom surface formed at the center thereof, wherein the aforementioned bit mate flutes become wider radially outwardly from the central portion of the screw head portion, and an opening angle between sidewall portions of the aforementioned adjacent respective flutes, facing to each other, is an acute angle slightly smaller than a right angle. When the blade portions of the driver bit are brought into contact with the respective sidewall portions of the bit mate flutes of the screw, formed to become wider outwardly, it was found that the clearance between the blade portions and the flutes could be made as small as possible to achieve appropriate mating of the screw with the driver bit and the come-out phenomenon could be reliably prevented.

Furthermore, as a screw that fits the aforementioned driver bit, used is a screw comprising stepped portions provided for end portions of bit mate flutes of a screw head portion; inclined flute portions extendedly formed to orient towards a central portion of a screw neck portion from these stepped portions; a substantially conical bottom surface formed at a bottom portion thereof; and wall portions formed at the end portions of the aforementioned bit mate flutes and recessed inwardly over a predetermined depth from the vertical and recessed substantially in the shape of "<" in cross section. It was found with the screw that the portions recessed from the vertical always served as a gap portion and thus dust particles or foreign objects could be removed by pushing them into the aforementioned gap portion. It was also found that the degrees of freedom of the distal end of the driver bit were expanded at the time of mating the driver bit with the screw and the distal ends of the blade portions could be always appropriately mated with the screw, thereby making it possible to facilitate smooth screwing and unscrewing.

Therefore, an object of the present invention is to provide a combination of driver bits and screws which can prevent damage caused by slidingly chafing against the surface of a screw head portion and which can prevent positively a come-out phenomenon in fitting with a screw, thereby always effecting appropriate and quick screwing and thus providing significantly improved working efficiency.

DISCLOSURE OF THE INVENTION

In order to achieve the aforementioned objects, the driver bit according to the present invention is a driver bit fit for a screw with substantially vertical end wall portions of a predetermined depth, the wall portions being formed at end portions of bit mate flutes of a screw head portion, with substantially planar bottom portions formed to orient towards a central portion of a screw neck portion from lower rim portions of the vertical end wall portions, and with a conical bottom surface formed at the central portion thereof, the aforementioned driver bit characterized by comprising flat blade portions having substantially vertical end portions for fitting a distal end portion thereof into the bit mate flutes of the screw head portion along the vertical end wall portions, wherein a distal end face of the flat blade portions is formed as a conical projected portion inclined at an angle of from 1° to 45° relative to the horizontal.

In this case, the aforementioned conical projected portion at the distal end face of the flat blade portions can be formed to incline at an angle of from 25° to 35° relative to the horizontal.

Moreover, the aforementioned conical projected portion at the distal end face of the flat blade portions can be so formed as to make the conical surface thereof a single tapered surface or multi-stepped tapered surfaces.

Furthermore, the aforementioned conical projected portion at the distal end face of the flat blade portions can have the conical surface formed in the shape of a convex or a concave in cross section.

On the other hand, both sidewall portions at the distal end of the flat blade portions can be so formed as to become wider outwardly in order to fit the bit mate flutes of the screw formed to become wider radially outwardly from the central portion of the screw head portion.

In addition, at least one of the flat blade portions can be provided with a notch extending from the distal end face thereof in the direction of the bit axis and having a predetermined length.

On the other hand, a screw which fits the driver bit according to the present invention is characterized by comprising stepped portions provided for end portions of bit mate flutes of a screw head portion, inclined flute potions extendedly formed to orient towards a central portion of a screw neck portion from the stepped portions, a substantially conical bottom surface formed at a bottom portion thereof, and wall portions formed at the end portions of the aforementioned bit mate flutes and recessed inwardly over a predetermined depth from the vertical.

In this case, the wall portions formed at the end portions of the bit mate flutes can be recessed substantially in the shape of "<" in cross section.

In addition, the bit mate flutes can be formed to become wider radially outwardly from the central portion of the screw head portion and an opening angle between sidewall portions of the aforementioned adjacent respective flutes, facing to each other, can be an acute angle slightly smaller than a right angle.

Furthermore, as a screw that fits the driver bit according to the present invention, such a plus/minus screw can be used in which a screw head portion is provided with crossed bit mate flutes; one of straight flutes of the crossed bit mate flutes is so formed as to allow blade portions of a plus driver bit to fit therein; the other straight flute is so formed as to allow blade portions of a minus driver bit to fit therein; substantially vertical end wall portions of a predetermined depth are formed at end portions of the aforementioned one of the straight flutes; and wall portions are formed substantially in the shape of "<" in cross section on the aforementioned vertical end wall portions over a predetermined depth and recessed inwardly from the vertical.

In addition, the present invention is characterized by combining the driver bit formed as described above and a screw comprising end portions of bit mate flutes of a screw head portion, formed as vertical end wall portions with a predetermined depth; stepped portions formed at lower rim portions of the vertical end wall portions; inclined flute portions formed to incline towards a central portion of a screw neck portion; a conical bottom surface formed at the center thereof. The screw is formed such that the aforementioned bit mate flutes become wider radially outwardly from the central portion of the screw head portion; and an opening angle between sidewall portions of the aforementioned adjacent respective flutes, facing to each other, is an acute angle slightly smaller than a right angle.

Furthermore, the present invention is characterized by combining the driver bit and a screw comprising horizontal bottom portions or inclined flute portions formed to orient towards a central portion of a screw neck portion from lower rim portions of end portions of bit mate flutes on a screw head portion; a conical bottom surface formed at the central portion thereof; and wall portions formed at the end portions of the aforementioned bit mate flutes and recessed inwardly over a predetermined depth from the vertical.

Still furthermore, the present invention is characterized by combining the driver bit and a plus/minus screw in which a screw head portion is provided with bit mate flutes composed of crossed flutes; one of straight flutes of the crossed bit mate flutes is so formed as to allow blade portions of a plus driver bit to fit therein; the other straight flute is so formed as to allow blade portions of a minus driver bit to fit therein; and substantially vertical end wall portions of a predetermined depth are formed at end portions of the aforementioned one of the straight flutes.

In this case, the aforementioned plus/minus screw can be formed such that the one straight flute of the bit mate flutes is formed substantially to become wider outwardly; a flute is formed substantially to become wider outwardly in the other straight flute; and blade portions of a driver bit are brought into contact with respective side wall portions of the aforementioned flutes made wider outwardly, at the same time and with equal clearances.

BEST MODE FOR CARRYING OUT THE INVENTION

Now, the embodiments of the combination of a driver bit and a screw according to the present invention will be explained in detail below with reference to the accompanying drawings.

Embodiment 1

(Structural Example 1 of a Driver Bit)

Figure 1:
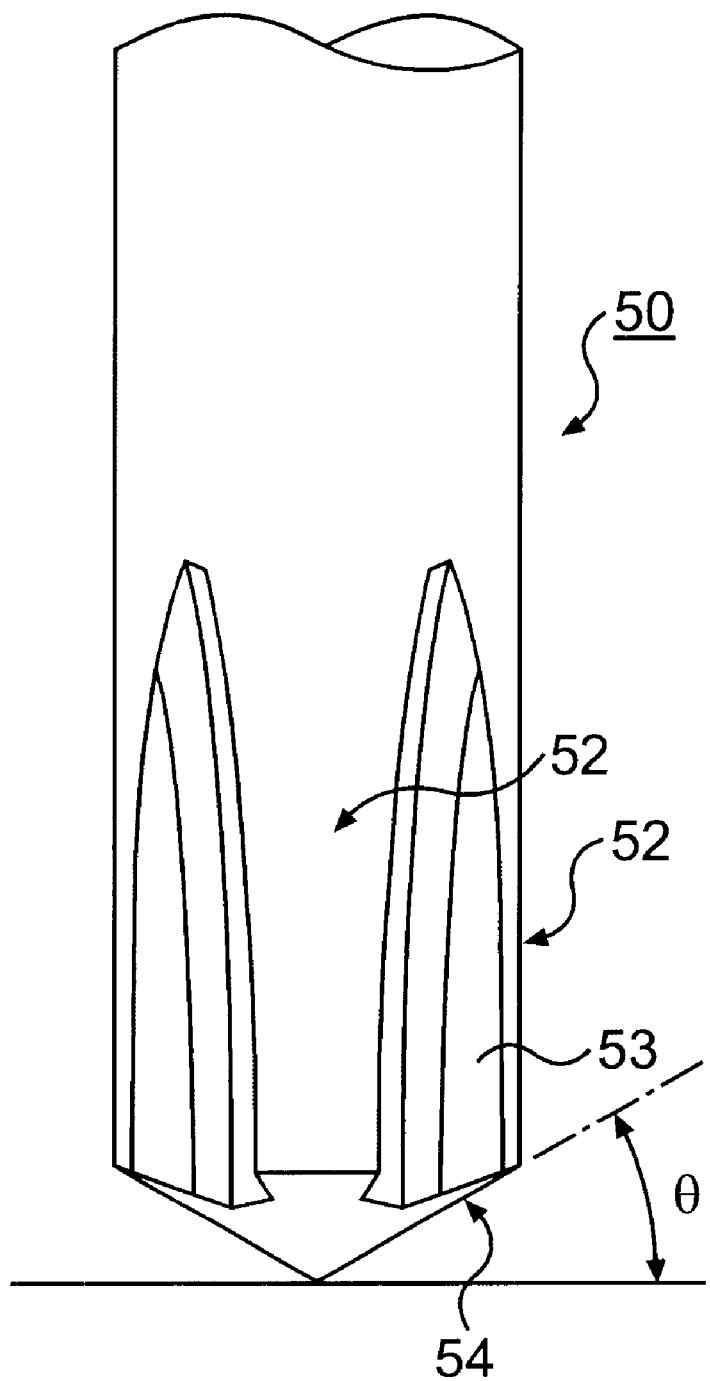
FIG. 1 is an enlarged side view illustrating the main portion of an embodiment of a driver bit according to the present invention.
Figure 2:
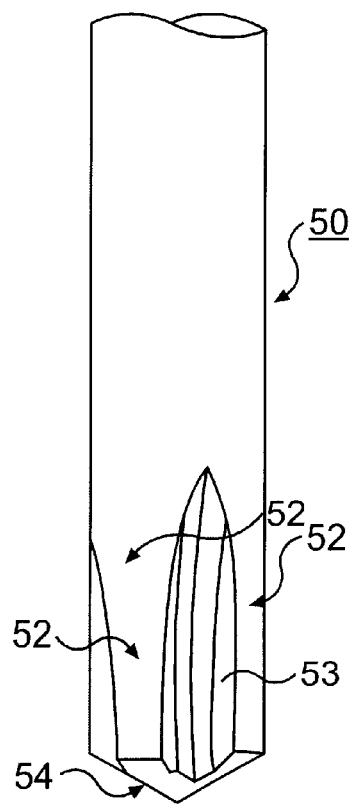
FIG. 2 is an enlarged perspective side view illustrating the main portion of the driver bit shown in FIG. 1.
Figure 3:
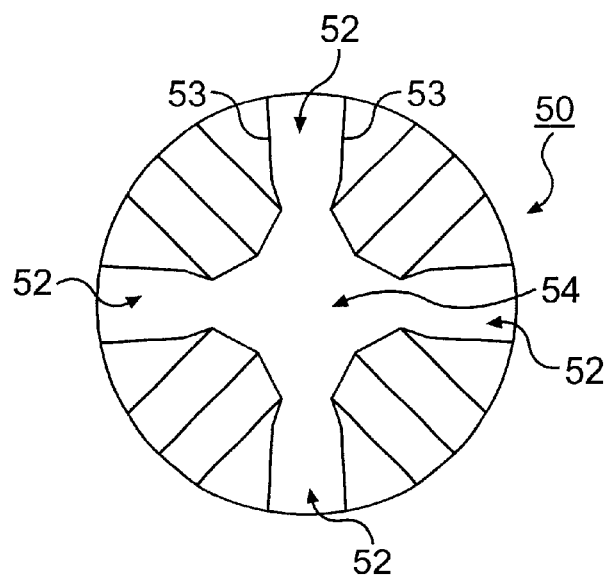
FIG. 3 is an enlarged bottom view illustrating the driver bit shown in FIG. 1.

FIGS. 1 to 3 show one embodiment of the driver bit according to the present invention. Referring to FIGS. 1 to 3, reference numeral 50 designates a driver bit according to the present invention. The distal end of blade portions of the driver bit 50 is adapted to fit bit mate flutes 32, formed as cross flutes, at the central portion of the screw head portion 30a of a conventionally suggested screw 30 shown in FIGS. 6 and 7.

Accordingly, the driver bit 50 of this embodiment comprises flat blade portions 52 for mating with the aforementioned bit mate flutes 32 of the aforementioned screw 30 and for engaging vertical end wall portions 32a and planar bottom portions 32b, formed at the end portions of the bit mate flutes 32. The driver bit 50 also comprises a distal end face of the aforementioned flat blade portions 52 or a conical projected portion 54 inclining at an angle θ of from 1° to 45°, preferably at an angle θ of from 25° to 35°, relative to the horizontal, corresponding to inclined flute portions 32c inclining towards the central portion of a screw neck portion 30b from the planar bottom portions 32b of the aforementioned bit mate flutes 32.

Incidentally, reference numeral 53 designates sidewall portions formed on the both side faces of the aforementioned flat blade portion 52 substantially vertically and permitted to be slightly tapered. Accordingly, the sidewall portions 53 are engageably brought into contact with sidewall portions 33 formed in the bit mate flutes 32 of the aforementioned screw 30. Accordingly, these driving faces will be provided with a sufficiently wide engagement area, thus preventing effectively the come-out phenomenon caused by the combination of a conventional screw and driver bit.

Figure 4A:
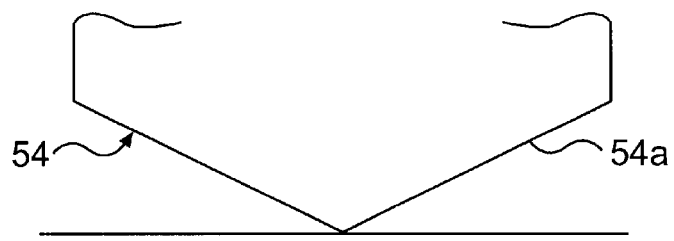
FIGS. 4(a)–(d) are schematic explanatory side views illustrating modifications of the distal end portion of the driver bit according to the present invention.
Figure 4B:
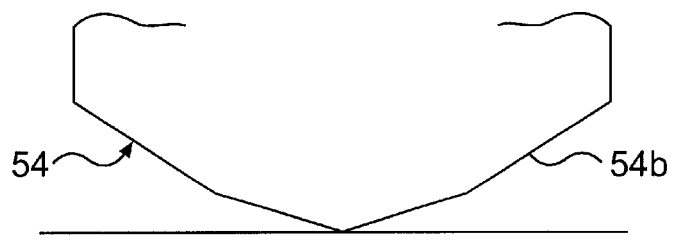
Figure 4C:
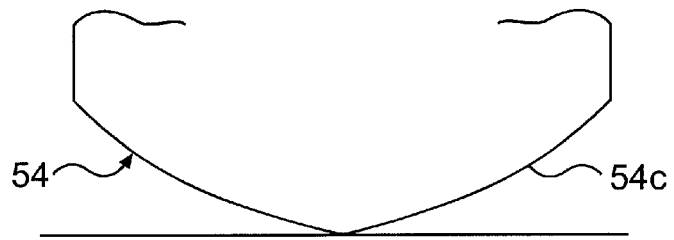
Figure 4D:
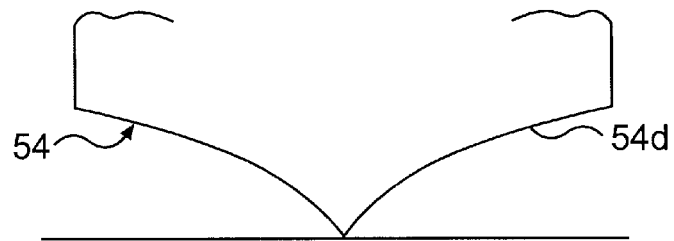

FIGS. 4(a)–(d) show modifications of the conical projected portion 54 formed on the distal end face of the flat blade portions 52 of the driver bit 50 according to the present invention, respectively. That is, FIG. 4(a) illustrates the conical surface of the aforementioned projected portion 54 formed as a single tapered surface 54a. In addition, FIG. 4(b) illustrates the conical surface of the aforementioned projected portion 54 formed as multi-stepped (two-step) tapered surfaces 54b each inclined at a different angle. Moreover, FIG. 4(c) illustrates the conical surface of the aforementioned projected portion 54 formed in cross section into the shape of a convex surface 54c. Finally, FIG. 4(d) illustrates the conical surface of the aforementioned projected portion 54 formed in cross section into the shape of a concave surface 54d.

Embodiment 2

(Structural Example 2 of Driver Bit)

Figure 5A:
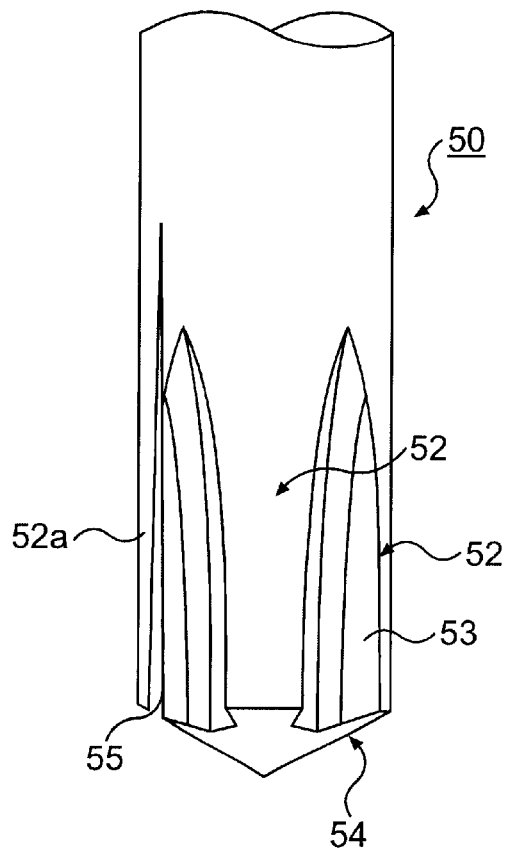
FIG. 5 shows another modification of the driver bit according to the present invention; (a) is an enlarged side view illustrating the main portion thereof; (b) is an enlarged bottom view thereof.
Figure 5B:
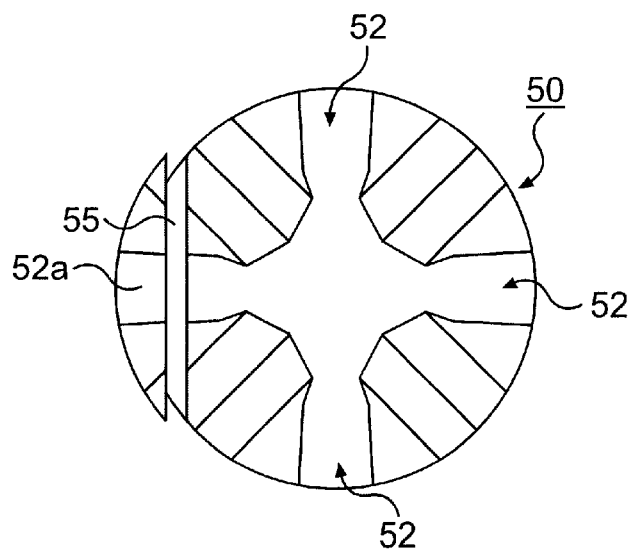

FIGS. 5(a) and (b) illustrate another embodiment of the flat blade portions 52 of the driver bit 50 according to the present invention. That is, in this embodiment, as shown in FIGS. 5(a) and (b), at least one of the flat blade portions 52 is adapted to have a notch 55, with a predetermined length and extending from the distal end face thereof in the direction of the bit axis.

Providing the notch 55 for the flat blade portion 52 as such leads to a blade section 52a that will be elastically and radially displaced from the axis center portion of the driver bit 50. The action of the blade section 52a facilitates retaining of the engagement of the driver bit with the bit mate flutes 32 of the screw 30, as described later.

Embodiment 3

(Structural Example 1 of a Screw)

Figure 6A:
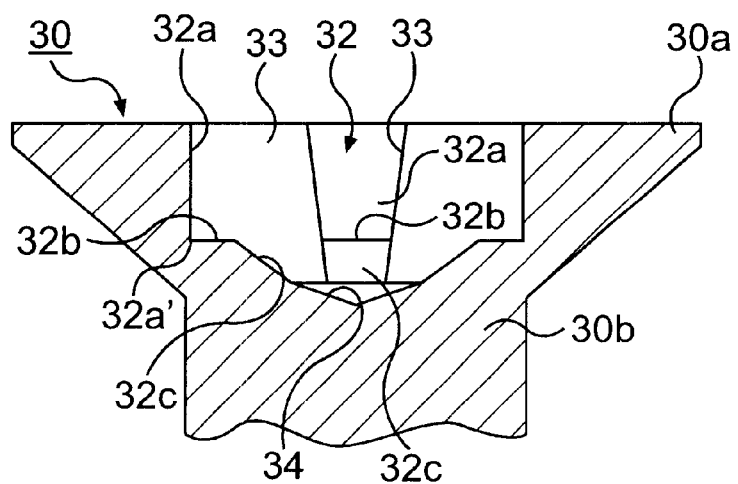
FIG. 6 shows a structural example of a screw to which the driver bit according to the present invention is applicable; (a) is an enlarged cross-sectional side view illustrating the main portion of a screw head portion; (b) is an enlarged plan view illustrating the screw head portion.
Figure 6B:
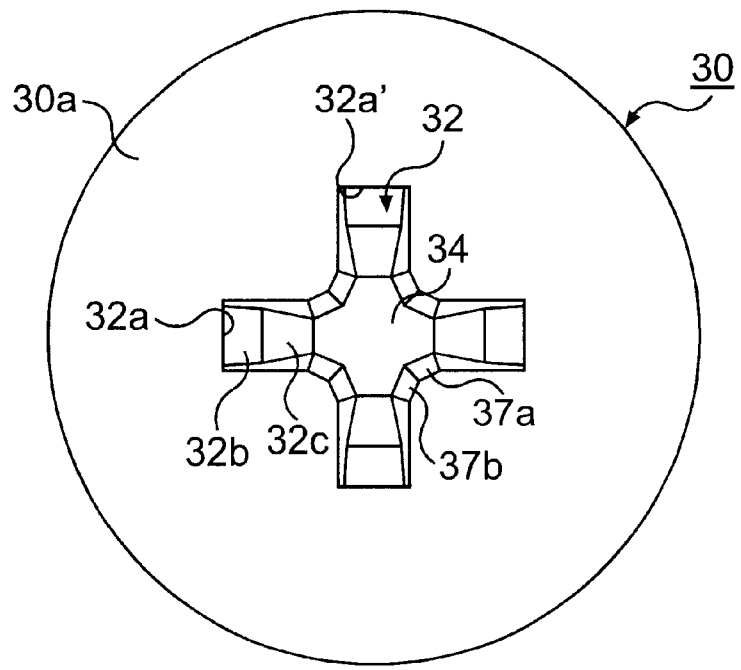

FIGS. 6(a) and (b) shows one structural example of the screw 30 applicable for use of the driver bit 50 according to the present invention. That is, in FIGS. 6(a) and (b), the screw 30 is provided with the bit mate flutes 32 on the head portion 30a. Incidentally, the bit mate flutes 32 are adapted to cross with each other at right angle in the shape of a plus (+) at the central portion of the screw head portion 30a. On the other hand, the bit mate flutes 32 are adapted to form the vertical end wall portions 32a with a predetermined depth at the end portions thereof. In addition, the planar bottom portions 32b are formed to orient from the lower rim portion 32a' of the end wall portion 32a towards the central portion of the screw neck portion 30b. Furthermore, the inclined flute portions 32c are formed to orient from the planar bottom portion 32b towards the central portion of the screw neck portion 30b. Finally, a substantially conical bottom surface 34 slightly inclined is formed at the central portion.

Incidentally, reference numeral 33 designates substantially vertical sidewall portions formed in between the adjacent bit mate flutes 32 as a draft taper inclined at an angle of about from 1.5° to 2° (an angle for a header punch to be withdrawn therefrom). Accordingly, the sidewall portions 33 are engageably brought into contact with the sidewall portions 53 of the flat blade portions 52 of the aforementioned driver bit 50 according to the present invention.

Figure 14:
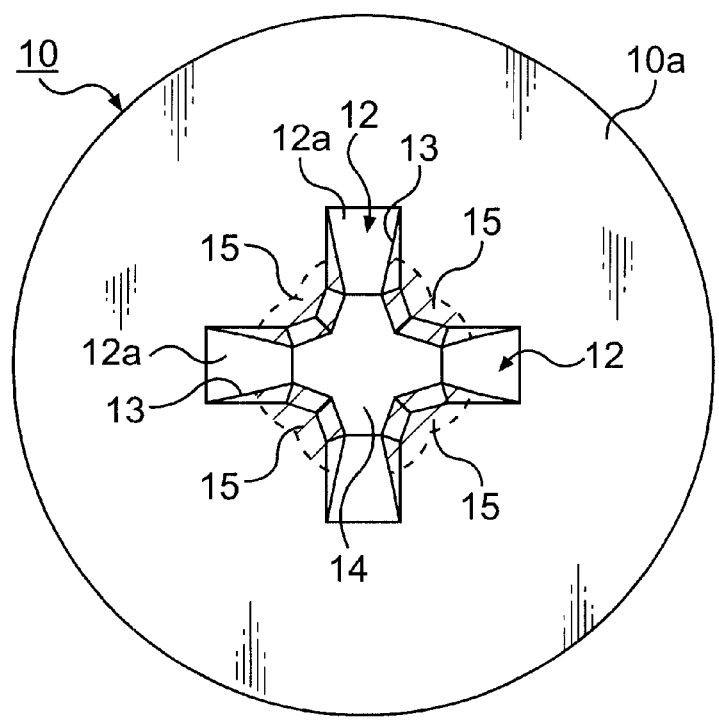
FIG. 14 is a plan view illustrating the screw head portion of the screw with crossed flutes shown in FIG. 13.
Figure 15:
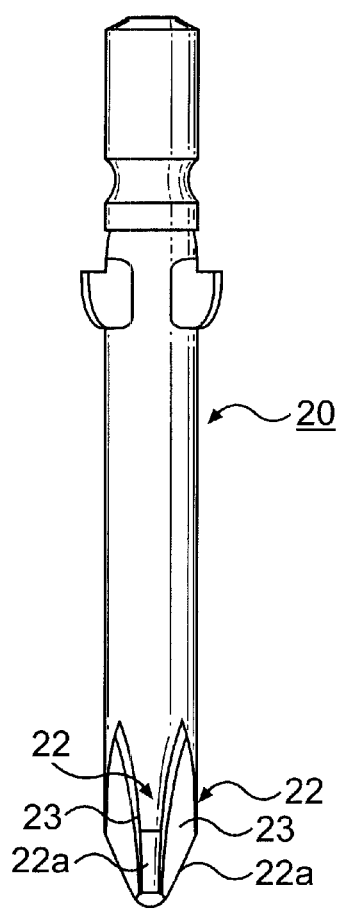
FIG. 15 is a side view illustrating the main portion of a driver bit for a conventional typical screw with crossed flutes.
Figure 16:
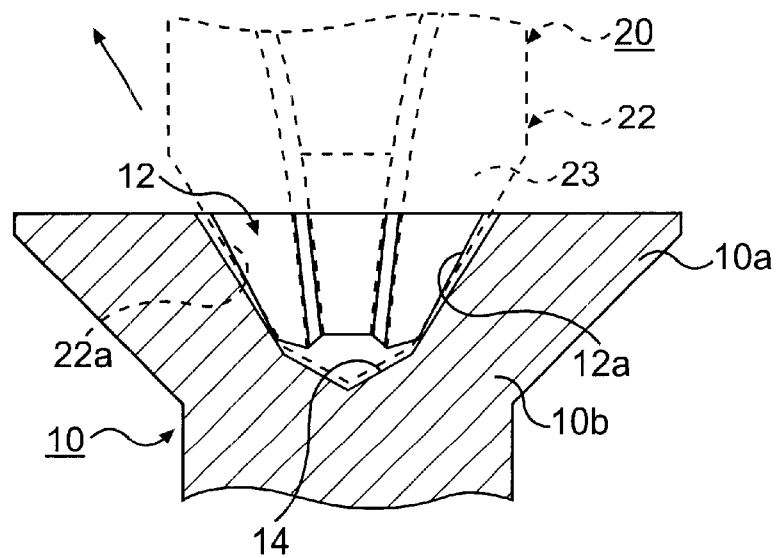
FIG. 16 is a cross-sectional side view showing the main portion of the screw with crossed flutes shown in FIG. 13 and the driver bit shown in FIG. 15, mating with each other.

Furthermore, like the prior-art screw with crossed flutes shown in FIG. 14, at the corners adjoining the aforementioned bit mate flutes 32, tapered coupling surfaces 37a, 37b are formed which extend from the position of the conical bottom surface 34 to the opening rim portions of the bit mate flutes 32 on the screw head portion 30a.

The screw 30 formed as such is provided, at the end portions of the bit mate flutes 32 of the screw head portion 30a, with the planar bottom portions 32b, and the inclined flute portions 32c are extendedly formed to orient from the planar bottom portions 32b towards the central portion of the screw neck portion 30b. The whole area of tapered contact portions of the bit mate flutes 32 is thereby reduced to be in partial contact with the driver bit. Moreover, this serves to make larger the area of the sidewall portions 33 (the area of the surface of the screw to which the driver bit exerts torque, that is, the area of driven surfaces) with which the distal end of the driver bit is in contact at the boundary portions between the adjacent bit mate flutes 32, 32.

Figure 7:
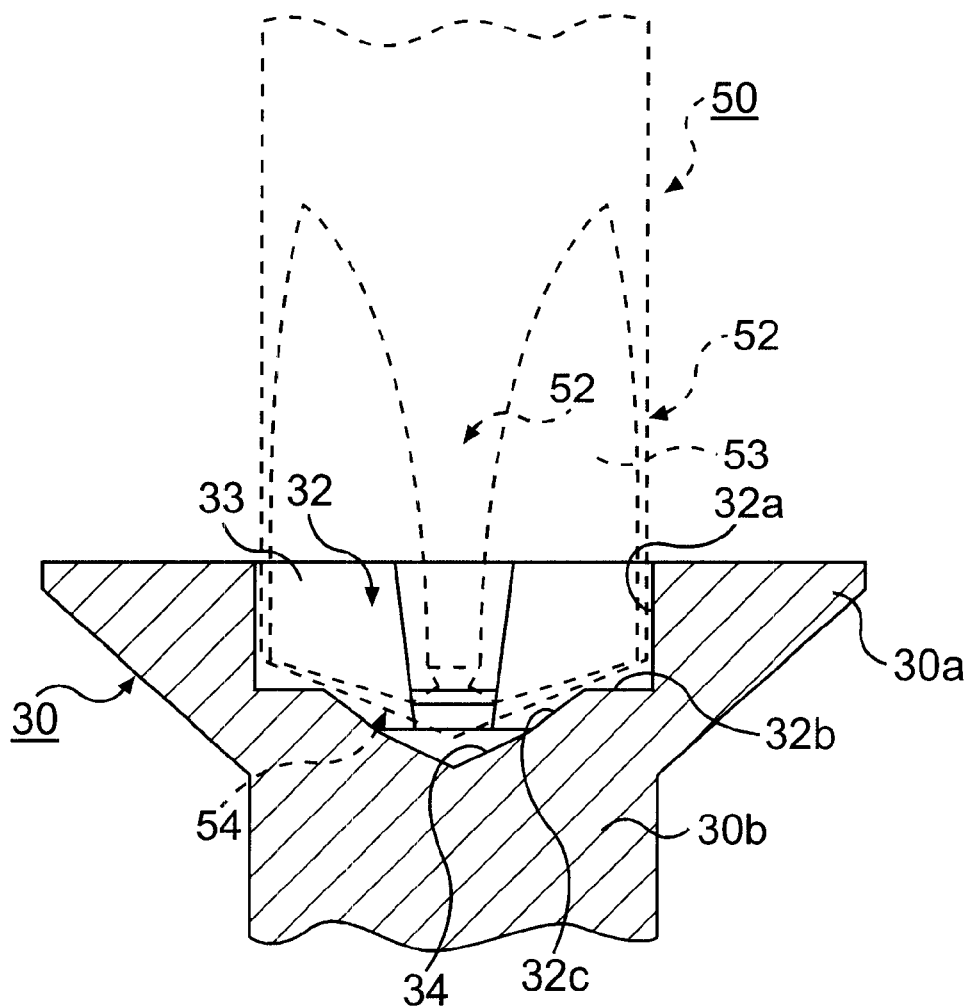
FIG. 7 is an enlarged cross-sectional side view illustrating the main portion of the driver bit according to the present invention mating with the screw shown in FIG. 6.

FIG. 7 illustrates the driver bit 50 according to the present invention and the screw 30 shown in FIGS. 6(a) and (b), mated with each other. That is, in this embodiment, as shown in FIG. 7, suppose the case where the flat blade portions 52 formed at the distal end of the driver bit 50 is brought in contact with the bit mate flutes 32 formed on the screw head portion 30a of the screw 30. Since the distal end face of the flat blade portions 52 is formed in the shape of a conical projected portion 54, the flat blade portions 52 contact with the opening rim portions of the aforementioned bit mate flutes 32 on a very small area consisting of points or lines and thus the central portions of the both can be aligned quickly and readily with each other. This makes it possible to less wear and damage the screw head portion, allowing immediate and precise mating between the driver bit 50 and the screw 30.

Embodiment 4
(Structural Example 2 of Screw)

Figure 8A:
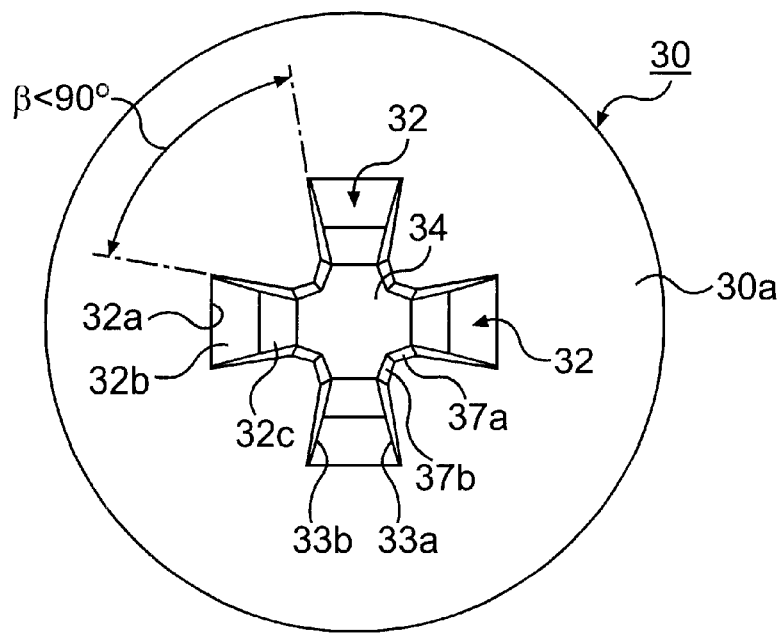
FIG. 8 shows another structural example of a screw which can be preferably applied to the driver bit according to the present invention; (a) is an enlarged plan view illustrating the screw head portion; (b) is an enlarged cross-sectional plan view illustrating the main portion of the screw head portion with which the driver bit mates.

FIGS. 8(a) and (b) illustrate another structural example of the screw 30 which can fit preferably the driver bit 50 according to the present invention, mated with each other. That is, in this embodiment, as shown in FIGS. 8(a) and (b), flutes 33a, 33b are formed so that the flute becomes wider radially outwardly from the central portion of the screw head portion 30a at the sidewall portions 33, opposite to each other, of the bit mate flute 32 of the screw 30. On the other hand, the sidewall portions 53 at the distal end of the flat blade portions 52 of the driver bit 50 are adapted to fit the flutes 33a, 33bthat become wider outwardly, corresponding to the screw 30 formed as such. That is, the sidewall portions 53 are formed as sidewall portions 53a, 53b that become wider outwardly.

Suppose a case where the flat blade portions 52 of the driver bit 50 are brought into contact with the respective sidewall portions (T1, T2, T3, and T4) of the bit mate flutes 32 of the screw 30 where the flutes 33a, 33b are formed to become wider outwardly. In this case, forming the sidewall portions 53a, 53b to become wider outwardly at the distal end of the flat blade portions 52 of the driver bit 50 makes as small as possible the clearance between the aforementioned flutes 33a, 33b and the aforementioned sidewall portions 53a, 53b to allow appropriate mating between the screw and the driver bit.

Moreover, the opening angle β of the adjacent sidewall portions of respective flutes 33a, 33b, facing to each other, may be set to make an acute angle slightly smaller than a right angle, thereby ensuring the prevention of the come-out phenomenon of the driver bit 50 in fastening screws and thus effecting balanced torque transmission to the screw 30.

Embodiment 5
(Structural Example 3 of Screw)

Figure 9A:
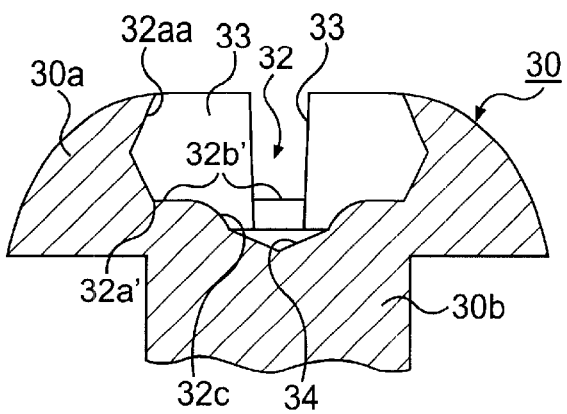
FIG. 9 shows still another structural example of a screw which can be preferably applied to the driver bit according to the present invention; (a) is an enlarged cross-sectional side view illustrating the main portion of the screw head portion; (b) is an enlarged plan view illustrating the screw head portion; (c) is an enlarged cross-sectional plan view illustrating the main portion of the screw head portion with which the driver bit mates.

FIGS. 9(a), (b), and (c) illustrate still another structural example of the screw 30 which can fit preferably the driver bit 50 according to the present invention, mated with each other. That is, in this embodiment, as shown in FIGS. 9(a) and (b), wall portions 32aa are formed substantially in the shape of "<" in cross section at the end portions of the bit mate flutes 32 of the screw 30, the wall portions 32aa being recessed inwardly a predetermined depth from the vertical surface. Then, stepped portions 32b' are provided to extend substantially in the horizontal direction from the lower rim portion 32a' of the recessed wall portions 32aa. Moreover, the respective inclined flute portions 32c are formed to orient from the stepped portions 32b' towards the central portion of the screw neck portion 30b. Further, a substantially conical bottom surface 34 slightly inclined at the bottom portion is formed. Other configuration is the same as that of the screw 30 of the aforementioned embodiment 3 shown in FIGS. 6(a) and (b).

According to the screw 30 of this embodiment, the recessed wall portions 32aa and the stepped portions 32b' are provided at the end portions of the bit mate flutes 32 of the screw head portion 30a, respectively. Furthermore, the respective inclined flute portions 32c are extendedly formed to orient from the end portions of the aforementioned stepped portions 32b' towards the central portion of the screw neck portion 30b. The whole area of tapered contact portions of the bit mate flutes 32 is thereby reduced to be in partial contact with the driver bit. Moreover, this serves to make larger the area of the sidewall portions 33 with which the distal end of the driver bit is in contact at the boundary portions between the adjacent bit mate flutes 32, 32.

Figure 9B:
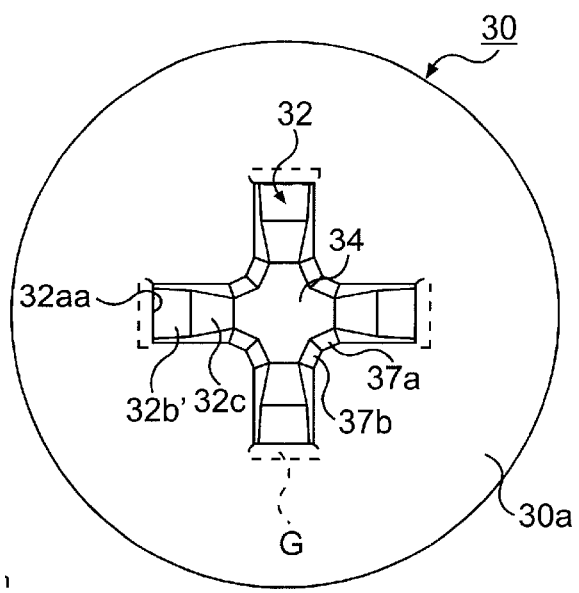
Figure 9C:
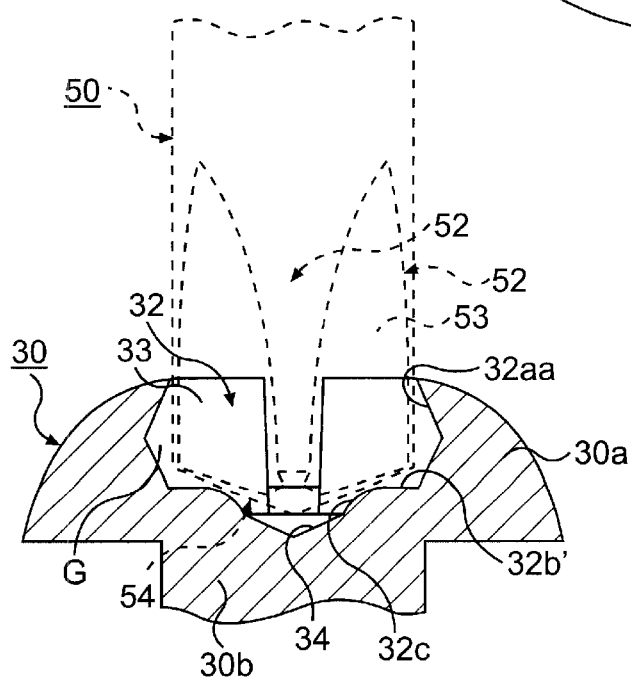

That is, according to this embodiment, as shown in FIG. 9(c), the distal end of the flat blade portions 52 of the driver bit 50 fits into the respective stepped portions 32b' of the bit mate flutes 32 of the screw 30, then the sidewall portions 53 of the aforementioned distal end of the blade portion are brought into contact with the sidewall portions 33 of the bit mate flutes 32 of the screw 30, and then the driver bit 50 is rotated, thereby effecting the transmission of predetermined torque to the screw 30. In particular, according to the combination of the screw 30 and the driver bit 50 of this embodiment, the portion recessed from the vertical surface always serves as a gap portion G when the recessed wall portions 32aa formed on the end portions of the bit mate flutes 32 of the screw 30 mate with the driver bit 50. Accordingly, forceful fitting of the driver bit 50 therein can remove dust particles or foreign objects in the bit mate flutes 32 by pushing them into the aforementioned gap portion G. This will make it possible to facilitate positive mating between the distal end of the blade portion of the driver bit 50 and the bit mate flutes 32 of the screw 30.

In addition, according to the combination of the screw 30 and the driver bit 50 of this embodiment, when a typical plus driver bit is used to damage the opening portion side of the bit mate flutes 32 in screwing or unscrewing, the aforementioned driver bit 50 can be used to remove the cut particles stacked in the bit mate flutes 32 by pushing them into the gap portion G. At the same time, the aforementioned driver bit 50 achieves appropriate mating between the bottom portion side of the bit mate flutes 32 and the distal end of the blade portion of the driver bit 50, thus allowing screwing or unscrewing to be completed.

Furthermore, according to the combination of the screw 30 and the driver bit 50 of the present invention, the driver bit 50 can fit into the bit mate flutes 32 readily and positively even when the driver bit 50 is attempted to fit into the bit mate flutes 32 while the driver bit 50 is slightly inclined relative to the axial direction of the screw 30. This is because the presence of the aforementioned recessed wall portions 32aa provides extended degrees of freedom to the distal end of the driver bit 50.

Embodiment 6
(Structural Example 4 of Screw)

Figure 10A:
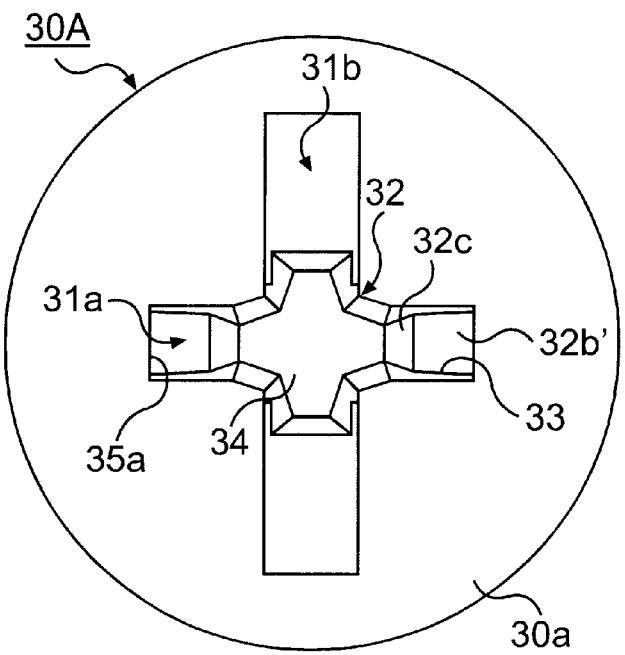
FIG. 10 shows structural examples of a plus/minus screw to which the driver bit according to the present invention is applicable; (a) is an enlarged plan view illustrating the screw head portion of the plus/minus screw showing a structural example; (b) is an enlarged plan view of the screw head portion of the plus/minus screw showing a modification thereof.

FIGS. 10(a) and (b) illustrate still other structural examples of the screw 30 which can fit the driver bit 50 according to the present invention, respectively.

That is, FIG. 10(a) shows a plus/minus screw 30A with a pair of straight flutes 31a, 31b crossing with each other on the central portion of the screw head portion 30a. According to the plus/minus screw 30A of this embodiment, one of the aforementioned straight flutes 31a is adapted to form vertical end wall portions 35a having a predetermined depth at the end portions. In addition, the stepped portions 32b' are formed so as to extend from the lower rim portions of the vertical end wall portions 35a substantially in the horizontal direction. Then, the respective inclined flute portions 32c are formed to orient from the stepped portions 32b' towards the central portion of the screw neck portion. Further, a substantially conical bottom surface 34 slightly inclined at the bottom portion is formed. In addition, the aforementioned other straight flute 31b is formed so as to extend horizontally, provided with a width and a depth enough to engageably contact with the blade portion of a minus driver bit. Thus, the driver bit 50 according to the present invention can also be used for the plus/minus screw 30A formed as such.

Figure 8B:
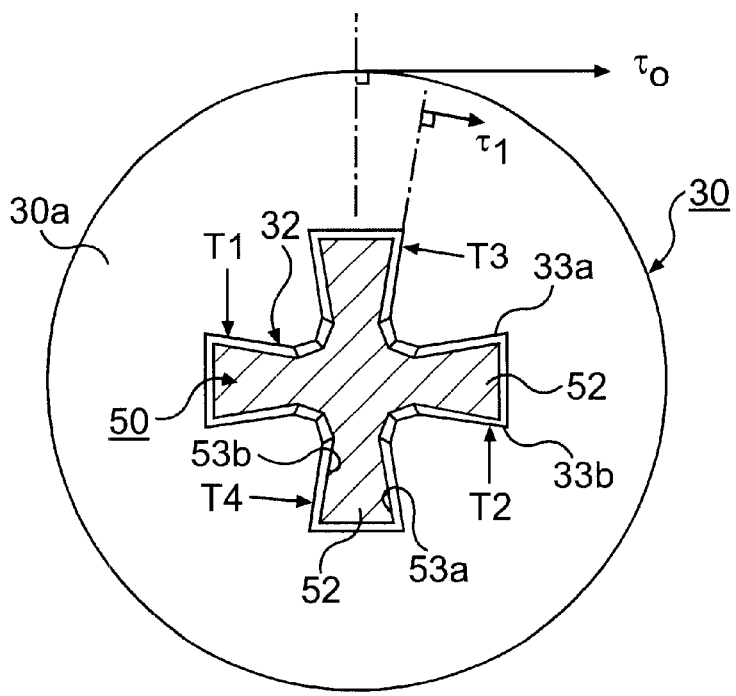
Figure 10B:
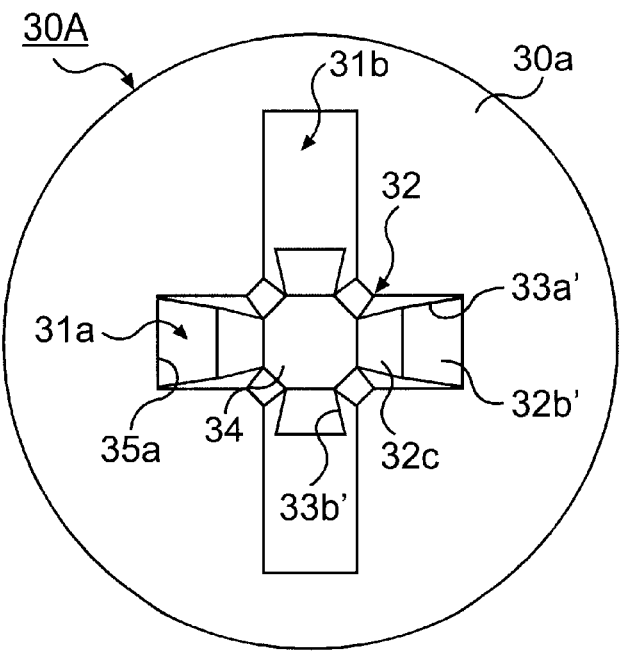

FIG. 10(*b*) illustrates a modification of the aforementioned plus/minus screw 30A. That is, in this case, flutes 33*a*', 33*b*' are so formed as to become wider outwardly in one straight flute 31*a* and the other straight flute 31*b* of the plus/minus screw 30A, based on their correspondence with the blade portions 52 of the aforementioned driver bit 50. Being configured as such, the plus/minus screw 30A can provide the same action and effect as those provided by the screw 30 of the aforementioned embodiment 4 shown in FIGS. 8(*a*) and (*b*) when the blade portions 52 of the driver bit 50 are mated with the bit mate flutes of the plus/minus screw 30A.

Embodiment 7
(Structural Example 5 of Screw)

Figure 11A:
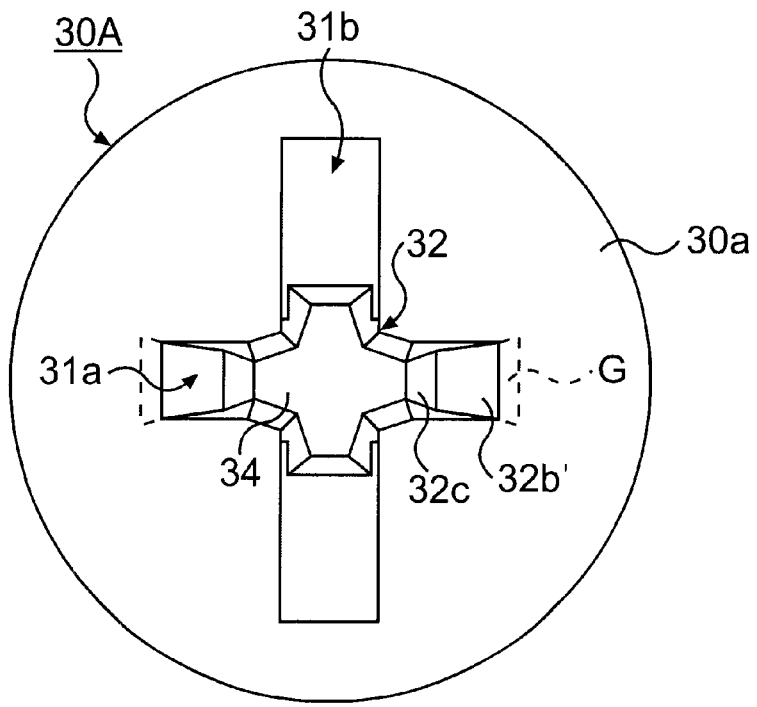
FIG. 11 shows a modification of the screw shown in FIG. 10; (a) is an enlarged plan view of the screw head portion; (b) is an enlarged cross-sectional side view illustrating the main portion of the screw head portion.
Figure 11B:
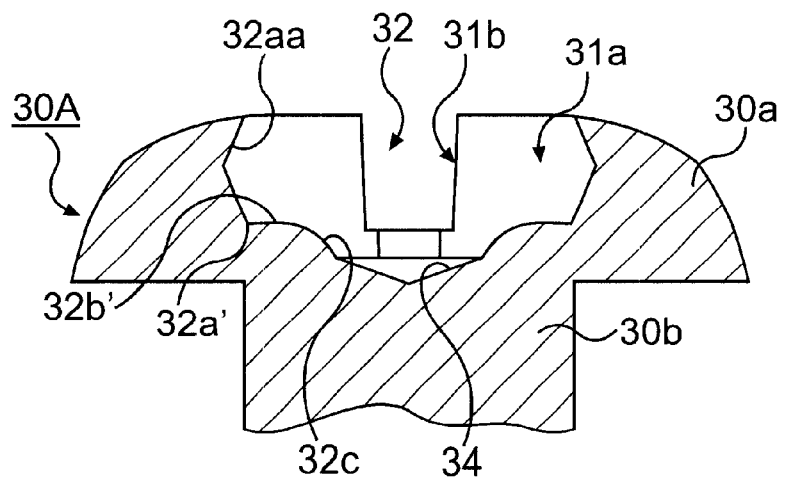
Figure 12A:
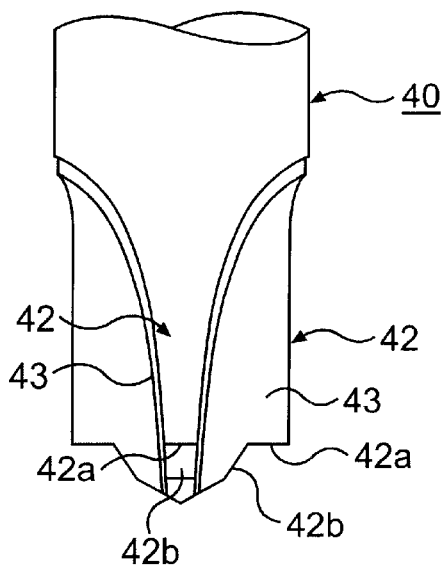
FIG. 12 shows a structural example of a screw and a driver bit fit therefor, which are conventionally suggested; (a) is an enlarged side view illustrating the main portion of the driver bit; (b) is an enlarged cross-sectional side view illustrating the main portion of one structural example of the conventionally suggested screw and the driver bit mating therewith; (c) is an enlarged cross-sectional side view illustrating the main portion of another structural example of the conventionally suggested screw and the driver bit mating therewith.
Figure 12B:
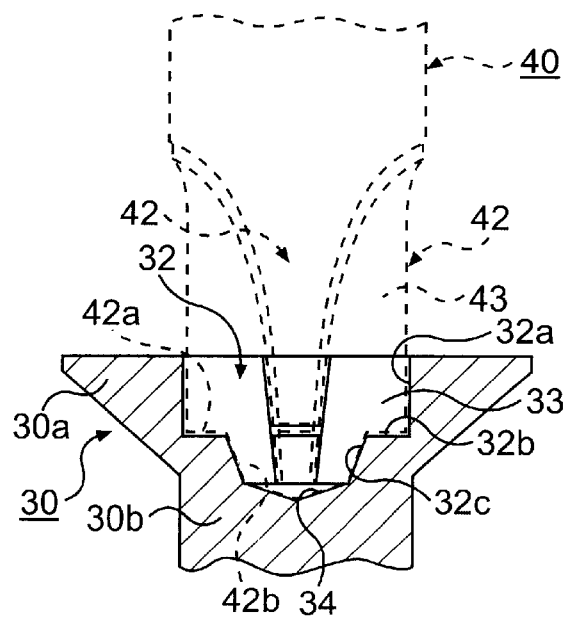
Figure 12C:
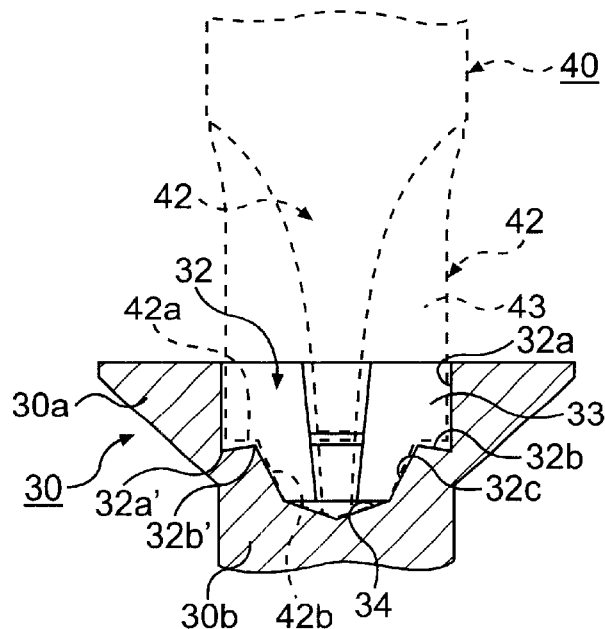
Figure 13:
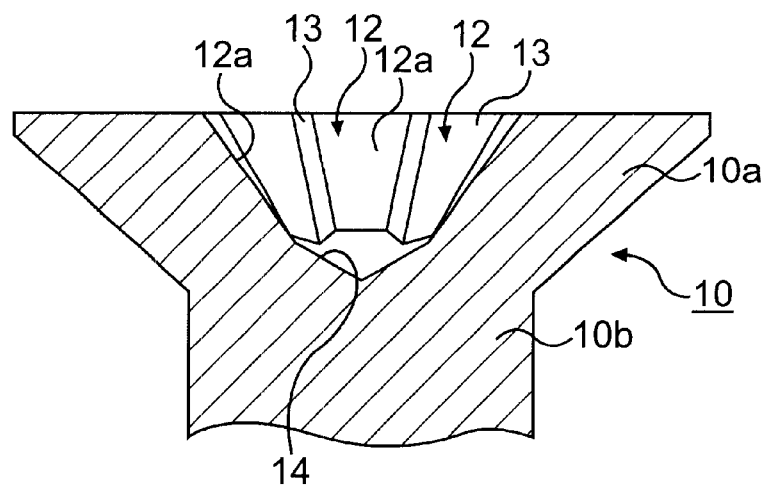
FIG. 13 is a cross-sectional side view illustrating the main portion of a conventional typical screw with crossed flutes.

FIGS. 11(*a*) and (*b*) illustrate another modification of the plus/minus screw 30A of the aforementioned embodiment 6 shown in FIGS. 10(*a*) and (*b*). That is, in this embodiment, as shown in FIGS. 11(*a*) and (*b*), the wall portions 32*aa* are formed substantially in the shape of "<" in cross section at the end portions of the bit mate flutes 32 with respect to one of straight flutes 31*a* of the plus/minus screw 30A. Here, the wall portions 32*aa* are recessed inwardly a predetermined depth from the vertical surface. Thus, the same bit mate flutes 32 as those of the screw 30 of the aforementioned embodiment 5 shown in FIG. 9(*a*) are formed.

Therefore, forming the plus/minus screw 30A as such can provide the same action and effect as those of the screw 30 according to the aforementioned embodiment 5.

The preferred embodiments of the present invention have been described in the foregoing. However, the present invention is not limited to the aforementioned embodiments. For example, in the aforementioned respective structural examples of the screws, the present invention is also applicable even to pan-headed or flat-headed screws. Moreover, the respective structural examples can be effectively combined for use. Thus, it is believed obvious that various modifications can be made in the invention without departing from the spirit and scope of the present invention.

As is obvious from the aforementioned embodiments, the driver bit according to the present invention fits a screw with substantially vertical end wall portions of a predetermined depth, the wall portions being formed at end portions of bit mate flutes of a screw head portion, with substantially planar bottom portions formed to orient towards a central portion of a screw neck portion from lower rim portions of the vertical end wall portions, and with a conical bottom surface formed at the central portion. The driver bit comprises flat blade portions having substantially vertical end portions for fitting a distal end portion thereof into the bit mate flutes of the screw head portion along the vertical end wall portions, wherein a distal end face of the flat blade portions is formed as a conical projected portion inclined at an angle of from 1° to 45° relative to the horizontal. When the distal end of the aforementioned flat blade portions slidingly chafes against the surface of the screw head portion at the time of mating the distal end of the driver bit with the bit mate flutes, the surface would not be damaged at all. In addition, the distal end of the flat blade portions fits into the screw, thereby preventing positively the come-out phenomenon even while the driver bit is being rotated.

Furthermore, according to a combination of a driver bit and a screw of the present invention, the flat blade portions formed at the distal end of the driver bit is brought in contact with the bit mate flutes formed on the screw head portion of the screw. Since the distal end face of the flat blade portions is formed in the shape of a conical projected portion, the flat blade portions contact with the opening rim portions of the aforementioned bit mate flutes on a very small area consisting of points or lines and thus the central portions of the both can be aligned quickly and readily with each other. This will make it possible to less wear and damage the screw head portion, allowing immediate and precise mating between the driver bit and the screw.

Furthermore, the sidewall portions are formed to become wider outwardly at the distal end of the flat blade portions of the driver bit and the respective sidewall portions at the bit mate flutes of the screw are formed to become wider outwardly. This will make as small as possible the clearance between the driver bit and the screw. Moreover, the opening angle β of the adjacent sidewall portions of respective flutes, facing to each other, may be set to make an acute angle slightly smaller than a right angle. The come-out phenomenon of the driver bit in fastening screws can be thereby positively prevented and thus balanced torque transmission to the screw can be achieved.

What is claimed is:

1. A driver bit for a screw having a screw head portion, the screw head portion having bit mate flutes and substantially vertical end wall portions of a predetermined depth formed at end portions of the bit mate flutes, the bit mate flutes being formed to become wider radially outwardly from the central portion of the screw head portion, said driver bit comprising:

flat blade portions having substantially vertical end portions, the substantially vertical end portions having a distal end portion being formed to become wider outwardly and configured to be fitted into the bit mate flutes of the screw head portion along the substantially vertical end wall portions of the screw head portion; and a conical projected portion forming a distal end face of the flat blade portions, the conical projected portion having at least one surface inclined at an angle of from 25° to 35° relative to the horizontal.

2. The driver bit according to claim 1, wherein the conical projected portion has a single tapered surface.

3. The driver bit according to claim 1, wherein the conical projected portion has a single surface formed in the shape of a convex in cross section.

4. A screw comprising:

a screw neck portion;

a screw head portion having bit mate flutes, the bit mate flutes having stepped portions;

inclined flute portions extendedly formed to orient towards a central portion of the screw neck portion from the stepped portions;

a substantially conical bottom surface formed at a bottom portion of the inclined flute portions; and wall portions formed at end portions of the bit mate flutes and recessed inwardly, substantially in the shape of "<" in cross section, over a predetermined depth from the vertical.

5. The screw according to claim 4, wherein the bit mate flutes are formed to become wider radially outwardly from the central portion of the screw head portion and an opening angle between sidewall portions of adjacent respective bit mate flutes, facing each other, is an acute angle slightly smaller than a right angle.

6. A plus/minus screw comprising:

a screw head portion provided with a pair of straight flutes crossing each other, one of the straight flutes being configured to allow blade portions of a plus driver bit to fit therein and the other straight flute being configured to allow blade portions of a minus driver bit to fit therein; and wall portions formed at end portions of said one of the straight flutes and recessed inwardly, substantially in the shape of "<" in cross section, over a predetermined depth from the vertical.

7. A combination comprising:

a screw comprising:
- a screw neck portion;
- a screw head portion having bit mate flutes and vertical end wall portions of a predetermined depth formed at end portions of the bit mate flutes, the bit mate flutes being formed to become wider radially outwardly from the central portion of the screw head portion such that an opening angle between sidewall portions of adjacent respective flutes, facing each other, is an acute angle slightly smaller than a right angle;
- stepped portions formed at lower rim portions of the vertical end wall portions;
- inclined flute portions formed to incline towards a central portion of the screw neck portion from the stepped portions; and
- a conical bottom surface formed at a bottom portion of the inclined flute portions;

and a driver bit comprising:
- flat blade portions having substantially vertical end portions, the substantially vertical end portions having a distal end portion being formed to become wider outwardly and configured to be fitted into the bit mate flutes of the screw head portion along the vertical end wall portions of the screw head portion; and
- a conical projected portion forming a distal end face of the flat blade portions, the conical projected portion having at least one surface inclined at an angle of from 1° to 45° relative to the horizontal.

8. A combination comprising:

a screw comprising:
- a screw neck portion;
- a screw head portion having bit mate flutes and wall portions formed at end portions of the bit mate flutes, the wall portions being recessed inwardly over a predetermined depth from the vertical;
- horizontal bottom portions formed at lower rim portions of the wall portions;
- inclined flute portions formed to orient towards a central portions of the screw neck portion from the horizontal bottom portions; and
- a conical bottom surface formed at a bottom portion of the inclined flute portions;

and a driver bit comprising:
- flat blade portions having substantially vertical end portions, the substantially vertical end portions having a distal end portion being configured to be fitted into the bit mate flutes of the screw head portion; and
- a conical projected portion forming a distal end face of the flat blade portions, the conical projected portion having at least one surface inclined at an angle of from 1° to 45° relative to the horizontal;

wherein the bit mate flutes of the screw and the flat blade portions of the driver bit are formed substantially to become wider outwardly such that the flat blade portions and respective sidewall portions of the bit mate flutes are configured to be brought into contact with each other with equal clearance.

9. A combination comprising:

a plus/minus screw comprising:
- a screw head portion provided with a pair of straight flutes crossing each other, one of the straight flutes being configured to allow blade portions of a plus driver bit to fit therein and the other straight flute being configured to allow blade portions of a minus driver bit to fit therein; and
- substantially vertical end wall portions of a predetermined depth formed at end portions of said one of the straight flutes;

and a driver bit comprising:
- flat blade portions having substantially vertical end portions, the substantially vertical end portions having a distal end portion being configured to be fitted into said one of the straight flutes along the substantially vertical end wall portions of the plus/minus screw; and
- a conical projected portion forming a distal end face of the flat blade portions, the conical projected portion having at least one surface inclined at an angle of from 25° to 35° relative to the horizontal;

wherein the straight flutes of the plus/minus screw and the flat blade portions of the driver bit are formed substantially to become wider outwardly such that the flat blade portions and respective sidewall portions of the straight flutes are configured to be brought into contact with each other with equal clearance.

10. The driver bit according to claim 1, wherein the conical projected portion has multi-stepped tapered surfaces.

11. The driver bit according to claim 1, wherein the conical projected portion has a single surface formed in the shape of a concave in cross section.

* * * * *

UNITED STATES PATENT AND TRADEMARK OFFICE
CERTIFICATE OF CORRECTION

PATENT NO. : 6,378,406 B1
DATED : April 30, 2002
INVENTOR(S) : Totsu

It is certified that error appears in the above-identified patent and that said Letters Patent is hereby corrected as shown below:

Title page,
Item [57], ABSTRACT,
Line 16, change "part 12" to -- part --.

Column 15,
Line 50, change "central portions" to -- central portion --.

Signed and Sealed this

Twenty-fourth Day of September, 2002

Attest:

JAMES E. ROGAN
Attesting Officer    Director of the United States Patent and Trademark Office